US009560103B2

(12) United States Patent
Newell et al.

(10) Patent No.: US 9,560,103 B2
(45) Date of Patent: Jan. 31, 2017

(54) CUSTOM VIDEO CONTENT

(71) Applicant: EchoStar Technologies L.L.C., Englewood, CO (US)

(72) Inventors: Nicholas B. Newell, Highlands Ranch, CO (US); Omar A. Khan, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 533 days.

(21) Appl. No.: 13/927,263

(22) Filed: Jun. 26, 2013

(65) Prior Publication Data
US 2015/0006751 A1 Jan. 1, 2015

(51) Int. Cl.
*G06F 15/16* (2006.01)
*H04L 29/06* (2006.01)

(52) U.S. Cl.
CPC .................................. *H04L 65/601* (2013.01)

(58) Field of Classification Search
CPC .. H04L 65/601; H04L 65/605; G06Q 30/0277
USPC ............... 709/231, 219; 375/240.01, 240.16; 705/14.72
See application file for complete search history.

(56) References Cited

U.S. PATENT DOCUMENTS

| 9,373,169 B2* | 6/2016 | Varekamp ............... G06T 7/004 |
| 2003/0163815 A1 | 8/2003 | Begeja et al. |
| 2005/0196049 A1* | 9/2005 | Clark ............................ 382/232 |
| 2006/0217966 A1* | 9/2006 | Hu et al. ........................ 704/200 |
| 2007/0079229 A1* | 4/2007 | Johnson, II ....... G06F 17/30893 715/205 |
| 2008/0101456 A1* | 5/2008 | Ridge et al. ............. 375/240.01 |
| 2008/0195761 A1* | 8/2008 | Jabri ..................... H04L 65/605 709/250 |
| 2009/0106105 A1* | 4/2009 | Lewis .................... G06Q 30/02 705/14.69 |
| 2009/0307602 A1 | 12/2009 | Brewer et al. |
| 2010/0122313 A1* | 5/2010 | Ivgi ................................. 726/1 |
| 2011/0267440 A1* | 11/2011 | Kim ..................... G06T 7/0022 348/55 |
| 2012/0023522 A1* | 1/2012 | Anderson .............. G06Q 30/02 725/35 |
| 2012/0113227 A1* | 5/2012 | Paik ....................... H04N 9/045 348/46 |
| 2012/0194561 A1* | 8/2012 | Grossinger ............. G06F 3/005 345/661 |
| 2012/0254369 A1* | 10/2012 | Gillard .................. G06T 7/2033 709/219 |
| 2013/0034337 A1* | 2/2013 | Hefeeda ................. H04N 5/913 386/252 |
| 2013/0101039 A1* | 4/2013 | Florencio ................. 375/240.16 |
| 2013/0136307 A1* | 5/2013 | Yu .......................... H04N 7/181 382/103 |
| 2013/0263182 A1* | 10/2013 | Ivy ....................... H04N 21/458 725/34 |
| 2013/0304604 A1* | 11/2013 | Hoffman et al. ............ 705/26.5 |
| 2013/0324876 A1* | 12/2013 | Bernal .................. A61B 5/091 600/538 |

(Continued)

*Primary Examiner* — Thu Ha Nguyen
(74) *Attorney, Agent, or Firm* — Bejin Bieneman PLC

(57) ABSTRACT

A segment is defined in an item of media content. A first file is received that includes content to be added to the segment. A second file is received that includes depth information related to the first file. The depth information is used to extract, from the first file, the content to be added to the segment. The extracted content is added to the media segment.

20 Claims, 3 Drawing Sheets

(56) References Cited

U.S. PATENT DOCUMENTS

| | | | |
|---|---|---|---|
| 2013/0332066 A1* | 12/2013 | Jeung | G01C 21/3602 |
| | | | 701/420 |
| 2013/0346381 A1* | 12/2013 | Ottolenghi | 707/706 |
| 2014/0160247 A1* | 6/2014 | Shi | H04N 13/0239 |
| | | | 348/47 |
| 2014/0362253 A1* | 12/2014 | Kim | H04N 5/262 |
| | | | 348/231.4 |
| 2015/0029179 A1* | 1/2015 | Han | G06T 19/20 |
| | | | 345/419 |
| 2015/0085179 A1* | 3/2015 | Van Heugten | 348/349 |
| 2015/0089075 A1* | 3/2015 | Strigeus | G06F 17/30321 |
| | | | 709/231 |
| 2015/0091891 A1* | 4/2015 | Raheman | A63G 31/16 |
| | | | 345/419 |
| 2015/0116312 A1* | 4/2015 | Baik | H04N 13/0011 |
| | | | 345/419 |
| 2015/0199968 A1* | 7/2015 | Singhal | G01C 21/3629 |
| | | | 704/251 |
| 2015/0254732 A1* | 9/2015 | Snyder | G06Q 30/0277 |
| | | | 705/14.72 |
| 2015/0358597 A1* | 12/2015 | Pang | G06T 7/0075 |
| | | | 348/43 |
| 2015/0381965 A1* | 12/2015 | Atanassov | G06T 7/0051 |
| | | | 348/47 |
| 2015/0381970 A1* | 12/2015 | Sugimoto | H04N 13/0239 |
| | | | 348/51 |
| 2016/0012283 A1* | 1/2016 | Mitoma | B60R 1/00 |
| | | | 382/103 |
| 2016/0012567 A1* | 1/2016 | Siddiqui | G06T 3/4007 |
| | | | 382/154 |
| 2016/0105636 A1* | 4/2016 | Guo | H04N 19/597 |
| | | | 348/14.15 |
| 2016/0112630 A1* | 4/2016 | Kanumuri | H04N 5/23222 |
| | | | 348/239 |

* cited by examiner

CUSTOM VIDEO CONTENT

BACKGROUND

Media content producers may provide items of media content to a large number of consumers, e.g., via a broadcast, web downloads, etc. Accordingly, such items of media content are typically generic, that is, the items of media content, such as a television program, video clip, or the like, are generally not customized or tailored for a particular consumer, or for a particular set of consumers. In fact, mechanisms are lacking for customizing media content that is broadcast or otherwise provided to a variety of consumers. Also, mechanisms are lacking for personalized remote user participation in media content.

DRAWINGS

DETAILED DESCRIPTION

Introduction

Figure 1:
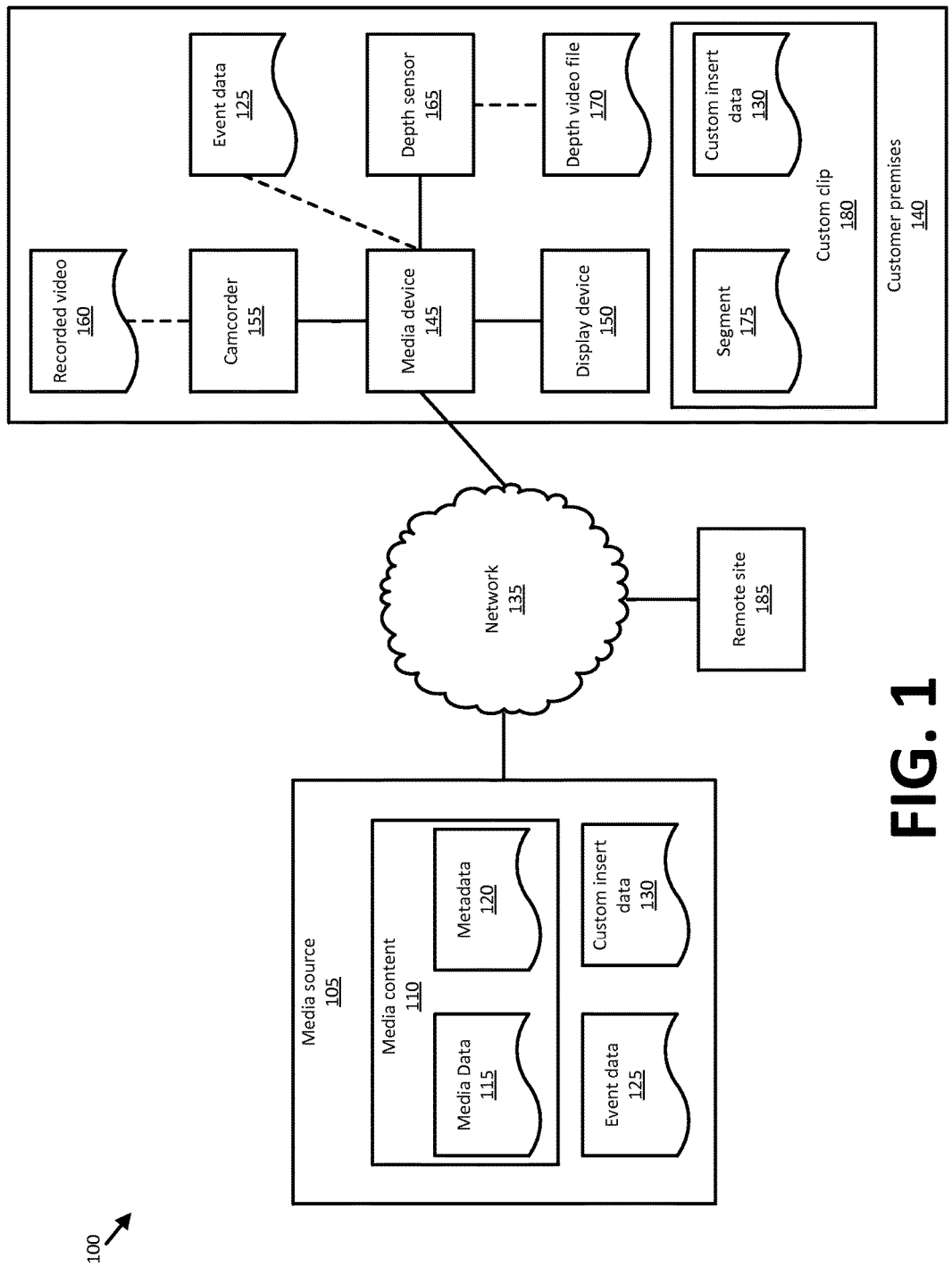
FIG. 1 is a block diagram of an exemplary media content delivery system.

FIG. 1 is a block diagram of an exemplary media content delivery system 100. Using certain elements of the system 100 as disclosed herein, a user can make a recording, e.g., of the user dancing, singing, speaking, etc., the recording then being inserted in video or the like that is broadcast, or otherwise made available, to other users. For example, a television program could feature a band singing a popular song. A user in the system 100 could be provided with advance information about the television program, including information to allow the user to make a recording for insertion into the television program. Upon making a recording, and providing the recording and other information to a media server, custom content created by the user and based on the recording may be inserted into the television program such that, for example, the user appears to be a member of the band featured in the program segment. Alternatively or additionally, a user upon viewing media content such as a television program, could make a recording or the like to be inserted into a clip from the media content, and shared with other users, e.g., via a graphical user interface (GUI) provided within the system 100, a social media site, etc.

Accordingly, with reference to certain of the exemplary elements shown in FIG. 1, a media source 105 in the system 100 includes media content 110, e.g., streaming content such as a video presentation such as a movie, television program, video clip, etc. The media content 110 may be provided via a network 135 to a media device 145 that is generally located in a customer premises 140. The media source 105 may also store event data 125 related to an item of media content 110. The event data 125 may be provided to a media device 145 in advance of the related item of media content 110. The event data 125 generally includes instructions for a user of the media device 145 to generate recorded video 160 that may be included in a future distribution, e.g., a broadcast, of the item of media content 110. Alternatively or additionally, event data 125 may be omitted, and a user of the media device 145 may create recorded video 160 to be included in a portion of an item of media content 110 that may be shared by the user via a remote site 185, e.g., a social media site.

Exemplary System Elements

Media Source

In general, media source 105 may include multiple elements for processing, storing, and providing media content 110 and related data. Elements of the media source 105 may be local to one another and/or may be distributed amongst multiple locations. For example, media source 105 may include one or more computer servers (some or all of which may be referred to as "media servers") and data storage devices, e.g., for storing and processing content 110 and other data such as discussed herein.

In general, the media source 105 may be any one or some combination of various mechanisms for delivering media content 110, e.g., one or more computing devices and storage devices, and may depend on a type of media content 110 being provided. By way of example and not limitation, media content 110 data may be provided as video-on-demand through a cable, satellite, or internet protocol television (IPTV) distribution system, as streaming Internet video data, or as some other kind of data. Accordingly, the media source 105 may include one or more of a cable or satellite television headend, a video streaming service that generally includes a multimedia web server (or some other computing device), or some other mechanism for delivering multimedia data. In general, examples of media content 110 include various types of data, including audio, video, images, etc.

Media content 110 is generally delivered via the network 135 in a digital format, e.g., as compressed audio and/or video data. The media content 110 generally includes, according to such digital format, media data 115 and media metadata 120. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content 110 may be provided in a format such as the MPEG-1, MPEG-2 or the H.264/MPEG-4 Advanced Video Coding standards (AVC) (H.264 and MPEG-4 at present being consistent), or according to some other standard or standards. For example, media content 110 could be audio data formatted according to standards such as MPEG-2 Audio Layer III (MP3), Advanced Audio Coding (AAC), etc. Further, the foregoing standards generally provide for including metadata, e.g. media metadata 120, along with media data 115, in a file of media content 110, such as the media metadata 120 discussed herein.

Media content 110 includes media content as it is usually provided for general distribution, e.g., a movie, television program, video file, audio file, etc. in a form has provided by a distributor of the media content 110. Alternatively or additionally, media content 110 may be modified from the form provided by a general distributor of content (e.g., recompressed, reencoded, etc.). The media data 115 includes data by which a display, playback, representation, etc. of the media content 110 is presented on a media device 145 and/or display device 150. For example, media data 115 generally includes units of encoded and/or compressed video data, e.g., frames of an MPEG file or stream.

Media metadata 120 may include metadata as provided by an encoding standard such as an MPEG standard. Alternatively and/or additionally, media metadata 120 could be stored and/or provided separately to a media device 145, apart from media data 115. In general, media metadata 120 provides general descriptive information for an item of media content 110. Examples of media metadata 120 include information such as content 110 title, chapter, actor information, Motion Picture Association of America MPAA rating information, reviews, and other information that describes an item of media content 110. Information for metadata 120 may be gathered from a content producer, e.g., a movie studio, media information aggregators, and other sources such as critical movie reviews.

Event data 125 may be provided from the media source 105 to one or more media devices 145 to provide specifications according to which a user of the media device 145 to provide recorded video 160 that may be included in custom insert data 130 for the item of media content 110. The event data 125 generally identifies an item of media content 110, e.g., according to an identifier and/or other descriptive information for the item of media content 110 included in its metadata 120.

Figure 2:
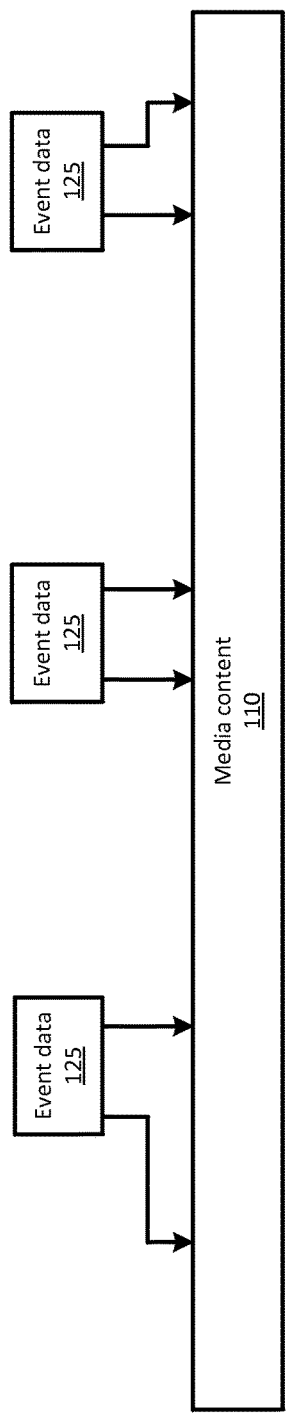
FIG. 2 is a block diagram of exemplary media content.

Further, event data 125 generally includes pointers to locations in media data 115, e.g., according to timestamps or other indices. Such pointers may be used to access one or more portions of media data 115, e.g., such as may be specified according to pointers or the like provided in the metadata 120 associated with the media data 115. For example, FIG. 2 is a block diagram of an exemplary item of media content 110 with event data 125 specifying various segments in the media content 110. As stated above, media data 115 is typically an encoded (e.g., MPEG) video stream or file. Metadata 120 includes indices or the like according to which event data 125 may point to a specified segment (or segments), e.g., a specified set of frames of the media data 115 included in the content 110.

Event data 125 further includes information about a location or locations in the media content 110 in which custom insert data 130 may be included. For example, as noted above, metadata 120 may identify a location or locations in media data 115 according to various indices. Such indices may be specified in event data 125, e.g., indicating one or more sets of frames of media data 115 that may be modified by custom insert data 130.

Figure 3:
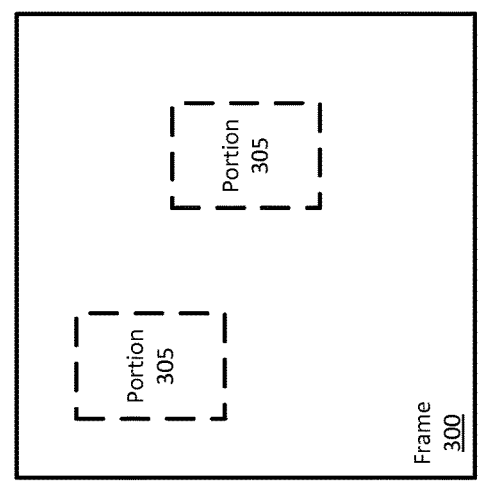
FIG. 3 is a block diagram of an exemplary frame of media data.

Moreover, event data 125 may include coordinate information or the like specifying coordinates in one or more sets of frames of media data 115 at which custom insert data 130 may be displayed. For example, FIG. 3 is a block diagram of an exemplary frame 300 of media data 115. Such frame 300 is generally a specified number of pixels wide by a specified number of pixels tall. Accordingly, a coordinate system for the frame 300 may be defined, e.g., an XY coordinate system having an origin in a lower left-hand corner of the frame 300. Using such coordinate system, portions or areas 305 in a frame 300 of media data 115 may be specified by specifying shapes located at coordinates in the frame 300, e.g., a square of a specified width in pixels having a lower left-hand corner at a specified coordinate, a rectangle with a specified length and width in pixels having a lower left-hand corner at a specified coordinate in the frame, etc. Further, it should be noted that coordinates specifying the areas 305 could be modified, e.g., according to input by a user of the media device 145. That is, a user of the media device 145 could be allowed to resize and/or relocate custom insert data 130 and/or custom clips 180, described below.

Event data 125 also may include specifications, e.g., text that may be displayed in a GUI of the media device 145, for a user to create recorded video 160 and/or a depth file 170. For example, for custom insert data 130 to be displayed in media content 110 as seamlessly as possible, it is generally desirable for the user to be standing a specified distance and/or at a specified angle with respect to a camcorder 155 included in or attached to the media device 145.

Custom insert data 130 generally refers to media content in a like format as media content 110 that includes media content extracted from recorded video 160, and according to data from a depth file 170, provided from a customer premises 140 as described further below. In general, the custom insert data 130 includes extracted media content that is sized for inclusion in one or more areas 305 of frames 300 of media data 115. Accordingly, media content 110 may be broadcast to, downloaded by, etc. multiple consumers including custom insert data 130. Further, as discussed below, custom insert data 130 may be generated by a media device 145 and provided to a remote site 185. In general, custom insert data 130 is extracted media content (e.g., video content 160) that may be used as added content to a segment of media content 110 specified in event data 125 or as added content to a segment 175, described below.

Network

Communications to and from the media source 105, customer premises 140, and one or more remote sites 185 may occur via the network 135. In general, the network 135 represents one or more mechanisms for delivering content 110 from the media source 105 to a media device 145. Accordingly, the network 135 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

Customer Premises

Turning to the customer premises 140, the media device 145 is generally a device including a computer processor and associated storage, e.g., volatile memory, nonvolatile memory, etc., and capable of communicating via the network 135. Exemplary media devices 145 include a set-top box, a personal computer such as a laptop, handheld, or tablet computer, a smart phone, etc.

The media device 145 may include a display and/or may be connected to a display device 150, e.g., a television, or may incorporate a display device 150, e.g., a display of a personal computer. When content 110 is referred to herein as being "displayed," it is to be understood that such display could include any possible mode of displaying media data, such as a display of visual data, audio data, etc. For example, content 110 could be displayed by showing video or image data on a screen with or without sound, by playing audio data with or without a visual display, etc.

As mentioned above, a camcorder 155 is generally included in, or attached to, the media device 145. The camcorder 155 is generally used for generating recorded media content such as recorded video 160, that may be included in custom insert data 130 and/or sent to a media source 105 and/or remote site 185.

Likewise, a depth sensor 165 is generally also included in, or attached to, the media device 145. Examples of depth sensors 165 are known, and include sensors such as may be embedded in gaming consoles or used in physical rehabilitation training devices that make use of virtual reality stimuli, etc. The depth sensor 165 may be used to generate a depth file 170, e.g., an MPEG file or the like. The depth sensor 165 is configured to determine a depth, or distance from the sensor 165, of objects being recorded. The depth file 170 depicts objects at various respective depths in various respective colors. Accordingly, assuming that a user has stood at a depth, or distance, from the camcorder 155 specified in event data 125, the media source 105 can use the depth file 170 to extract an image of the user, or other desired image, from recorded video 160 to generate custom insert data 130.

The media device 145 may also generate a custom clip 180. For example, a user viewing media content 110 may provide input to the media device 145, e.g., via a remote control, keyboard, or other input device, to indicate locations, sometimes referred to as bookmarks, in the media content 110, with respect to which the user wishes to generate custom insert data 130. The media device 145 may include instructions for extracting a segment 175 of the media content 110 according to the bookmarks. A user may then create recorded video 160 and a depth file 170, e.g., by standing a specified distance from the camcorder 155 and depth sensor 165, or by providing input to the media device 145 concerning a distance from the camcorder 155, etc. The recorded video 160 and depth file 170 may then be used to create custom insert data 130 in a fashion similar to the creation of custom insert data 130 in a media server included in the media source 105. The custom insert data 130 may then be inserted into the segment 175, resulting in a custom clip 180 that includes the segment 175 bookmarked by the user along with the recorded video 160 created by the user. Further, in addition to recorded video 160, a custom clip 180 could include other items provided by a user, e.g., according to input to a media device 145. For example, the user could type a message to be displayed in a text box overlaid on the segment 175, could provide alternative audio, etc.

As explained with respect to insertion of custom insert data 130 into media content 110, custom insert data 130 created by a media device 145 be sized to a predetermined proportion of a size of a frame 300 in the segment 175. Further, a user may be provided with a mechanism for providing input to the media device 145 concerning a size of the custom insert data, as well as a location, e.g., coordinates, of the custom insert data 130 in frames 300 included in the segment 175.

Once created, media device 145, e.g., according to user input and/or program instructions, may provide the custom insert data 130 created from a segment 175 to the media source 105 such that the custom insert data 130 may then be made available to other users. For example, a user may have a "friends" list or the like, according to which the media source 105 may share the custom insert data 130 provided from the media device 145. Similarly, the media device 145 may cause of the custom insert data based on the segment 175 to be provided to one or more remote sites 185 via the network 135. For example, the custom clip 130 could be provided to a social media site 185, where a user could post the custom clip 180 to the user's account.

Remote Sites

A remote site 185, as discussed above, may include a social media site, an e-commerce site, a news site, a site providing reference information, etc.

Exemplary Process Flows

Figure 4:
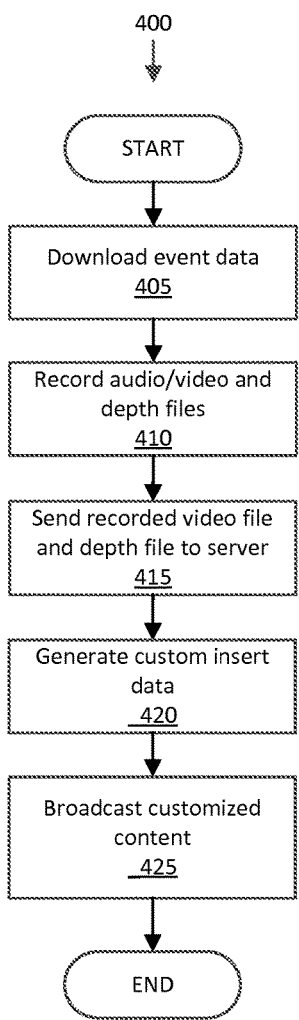
FIG. 4 is a diagram of an exemplary process for creating and using custom insert data.

FIG. 4 is a diagram of an exemplary process 400 for creating and using custom insert data 130. The process 400 may be executed according to instructions stored in a memory of the media device 145. However, as noted above, some or all of the process 400 could be executed in other manners, e.g., according to instructions stored and executed by a computing device in the media source 105.

In any event, the process 400 begins in a block 405 in which the media device 145 downloads, from a media source 105, some or all of the event data 125 concerning an item of media content 110. For example, the item of media content 110 may be an upcoming television program, a video file available for download on a website, etc. The event data 125 downloaded to the media device 145 generally includes an identifier for the associated media content 110, as well as instructions for a user to create recorded video 160 and a depth file 170 for custom insert data 130 to be inserted into the media content 110.

Next, in a block 410, a user records a video file 160 and a depth file 170 using camcorder 155 and depth sensor 165, respectively. As noted above, a user may make these recordings pursuant to instructions included in the data 125.

Next, in a block 415, when the recordings of the block 410 are complete, the media device 145 transmits the video file 160 and the depth file 170 to the media source 105, e.g., to a computer server in the media source 105.

Next, in a block 420, the media source 105 uses the received video file 160 and depth file 170 to generate custom insert data 130 for the media content 110. That is, the video file 160 generally includes user-recorded video intended to be inserted into media content 110. Using the depth file 170, which is generally simply a video file with various objects represented as one or more solid colors, different colors representing different depths, it is possible to identify an object in the video file 160, e.g., a person, at a specified distance or depth from the camcorder 155. Images of such desired object may be extracted from frames of the video file 160, and stored as custom insert data 130.

Next, in a block 425, custom insert data 130 may be included, e.g., at bookmarks, time indices, etc. specified in event data 125, in indicated frames of media data 115 in media content 110. Thus modified, the content 110 may be broadcast by, made available for download from, etc., the media source 105. A particular item of custom insert data 130 to be included in an item of media content 110 may be determined according to a variety of mechanisms, e.g., according to selection by an operator of the system 100, by random selection etc.

Following the block 425, the process 400 ends.

Figure 5:
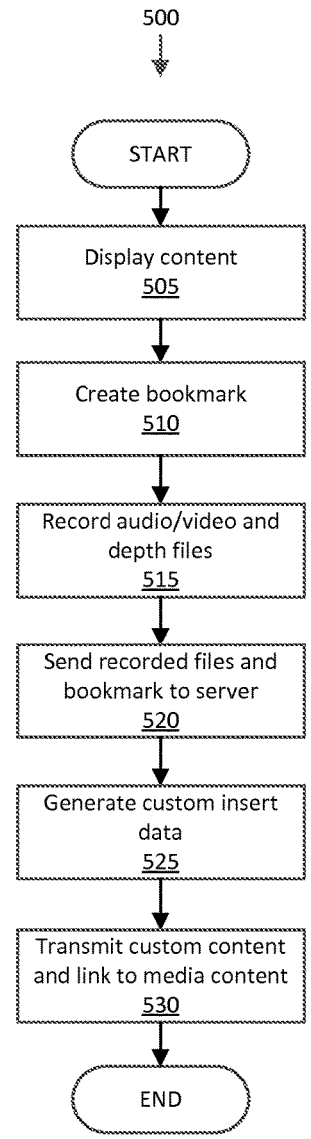
FIG. 5 is a diagram of an exemplary process for sharing custom content related to an item of media content.

FIG. 5 is a diagram of an exemplary process 500 for sharing custom content, generally in the form of custom insert data 130, related to an item of media content 110. The process 500 begins in a step 505, in which media device 145 displays an item of media content 110 from a media source 105, e.g., a television program or other broadcast, content 110 downloaded from a media server, etc.

Next, in a block 510, the user provides input to the media device 145, e.g., via a keyboard, remote control, etc., identifying locations, sometimes referred to as bookmarks, in the item of media content 110. For example, the user could replay the media content 110 from a digital video recorder (DVR) or the like included in or associated with the media device 145, and, during such playback, indicate starting and ending locations of the media content 110. Alternatively or additionally, the user could provide input while viewing media content 110, e.g., by selecting a button on the remote control, a key on a keyboard, etc. of the media device 145 to indicate a bookmark.

Next, in a block 515, the media device 145 stores recorded video 160 and a depth file 170 created by a user for insertion into the media content 110 according to the bookmark or bookmarks created as described with respect to the block 510. The media device 145 may also store user input, such as a depth or distance from the camcorder 155 at which the user is located wall recording the video 160. As explained above, this depth information allows for the extraction of an image of the user from the recorded video 160.

Next, in a block 520, the media device 145 generates a segment 175 of the media content 110, e.g., according to bookmarks created by a user as described above. For example, the bookmarks may indicate time indices in the media content 110, which time indices may be used to select the segment 175.

In some instances, the media device 145 may not have the media content 110 available, e.g., because broadcast video is not persisted in the media device 145, cannot be saved on and/or replayed from a digital video recorder (DVR) associated with the media device 145, etc. In these instances, when the process 500 reaches the block 520, the recorded video 160, depth file 170, bookmarks, and depth information may be sent to the media source 105, which then generates the segment 175.

Next, in a block 525, custom insert data 130 is generated by the media device 145, and combined with a segment 175, e.g., in a fashion such as described above with respect to the block 420 of FIG. 4 to generate a custom clip 180. That is, the custom clip 180 is a video file that includes content from an item of media content 110 in addition to recorded video 160 by a user that is added to the segment 175 by custom insert data 130. Alternatively, custom insert data 130 may be generated by the media source 105 as described above, and used with the segment 175, which also may be selected on the media source 105 as described above, to generate the custom clip 180.

Next, in a block 530, the media device 145 shares the custom clip 180. For example, the media device 145 may be used to provide the custom clip 180 to a remote site 185. Alternatively or additionally, the custom clip 180 may be provided to a remote site 185 by the media source 105. Further, the media source 105 and/or the media device 145 could provide a GUI listing various custom clips 180, and providing links that users may select to view one or more custom clips 180. Such links could be organized according to category, user identities (e.g., identities of a user having made a clip 180), etc. Further, access to such links could be provided in a variety of ways, e.g., restricted to other users, e.g. "friends," selected by that author of a custom clip 180, specific users identified by the user via an interface of the media device 145, etc.

Following the block 530, the process 500 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computer server that includes a processor and a memory, the server configured to:
   define a segment that is a specified set of frames in an item of media content;
   receive a first file that comprises a plurality of first video frames that include content to be added to the segment;
   receive a second file that comprises a plurality of second video frames, each of the second video frames including depth information for a corresponding one of the plurality of first video frames, the depth information including respective distances from a camera of one or more objects represented in the corresponding one of the plurality of first video frames;

use the depth information to extract, from each of the plurality of first video frames, a respective portion of the content to be added to respective frames of the specified set of frames in the segment; and add the respective portion of the content to the respective frames in the segment.

2. The server of claim 1, wherein the first file and the second file are recorded at a remote location and transmitted to the server via a network.

3. The server of claim 1, further configured to: determine, from metadata associated with the media content, coordinates for adding the extracted content to the segment; wherein adding the extracted content to the segment is performed according to the coordinates.

4. The server of claim 1, further configured to provide the media content, including the segment to which the extracted content has been added, to a remote media device.

5. The server of claim 1, further configured to provide to a remote media device specifications for the first file and the second file.

6. The server of claim 5, further configured to provide the specifications to the remote media device in advance of the media content.

7. A media device that includes a processor and a memory, the media device configured to:

play a stream of media content;

receive input identifying a segment that is a specified set of frames of the media content;

record each of a first file that comprises a plurality of first video frames and that includes additional media content and a second file that comprises a plurality of second video frames, each of the second video frames including depth information for a corresponding one of the plurality of first video frames, the depth information including respective distances from a camera of one or more objects represented in the corresponding one of the plurality of first video frames; and generate, based on part on the depth information in the plurality of second video frames, a custom clip that includes the segment and the additional media content.

8. The media device of claim 7, further configured to provide the custom clip to a remote site.

9. The media device of claim 7, further configured to provide a link to the custom clip to a remote site.

10. The media device of claim 7, further configured to provide a graphical user interface that includes links to a plurality of custom clips, each of the custom clips including respective segments of media content and additional media content.

11. A method, comprising:

defining a segment that is a specified set of frames in an item of media content;

receiving a first file that comprises a plurality of first video frames that includes content to be added to the segment;

receiving a second file that comprises a plurality of second video frames, each of the second video frames including depth information for a corresponding one of the plurality of first video frames, the depth information including respective distances from a camera of one or more objects represented in the corresponding one of the plurality of first video frames;

using the depth information to extract, from each of the plurality of first video frames, a respective portion of the content to be added to respective frames in the segment; and add the respective portion of the content to the respective frames in the segment.

12. The method of claim 11, wherein the first file and the second file are recorded at a remote location and transmitted to the server via a network.

13. The method of claim 11, further comprising: determining, from metadata associated with the media content, coordinates for adding the extracted content to the segment; wherein adding the extracted content to the media segment is performed according to the coordinates.

14. The method of claim 11, further comprising providing the media content, including the segment to which the extracted content has been added, to a remote media device.

15. The method of claim 11, further comprising providing to a remote media device specifications for the first file and the second file.

16. The method of claim 15, further comprising providing the specifications to the remote media device in advance of the media content.

17. A method, comprising:

playing a stream of media content;

receiving input identifying a segment that is a specified set of frames of the media content;

recording each of a first file that comprises a plurality of first video frames and that includes additional media content and a second file that comprises a plurality of second video frames, each of the second video frames including depth information for a corresponding one of the plurality of first video frames, the depth information including respective distances from a camera of one or more objects represented in the corresponding one of the plurality of first video frames; and generating, based on part on the depth information in the plurality of second video frames, a custom clip that includes the segment and the additional media content.

18. The method of claim 17, further comprising providing the custom clip to a remote site.

19. The method of claim 17, further comprising providing a link to the custom clip to a remote site.

20. The method of claim 17, further comprising providing a graphical user interface that includes links to a plurality of custom clips, each of the custom clips including respective segments of media content and additional media content.

* * * * *